United States Patent [19]

Kasugai et al.

[11] Patent Number: 5,678,590

[45] Date of Patent: Oct. 21, 1997

[54] FUEL CUTOFF VALVE

[75] Inventors: Joji Kasugai; Yoshihiro Nagino, both of Aichi, Japan

[73] Assignee: Toyoda Gosei Co., Ltd., Aichi, Japan

[21] Appl. No.: 526,679

[22] Filed: Sep. 11, 1995

Related U.S. Application Data

[62] Division of Ser. No. 320,652, Oct. 11, 1994, abandoned.

[30] Foreign Application Priority Data

Nov. 5, 1993 [JP] Japan ..................... 5-301241
Apr. 5, 1994 [JP] Japan ..................... 6-067417

[51] Int. Cl.$^6$ .................................................. F16K 31/22
[52] U.S. Cl. ........................ 137/202; 137/43; 137/630.14
[58] Field of Search ............................. 137/202, 630.14, 137/39, 43

[56] References Cited

U.S. PATENT DOCUMENTS

| | | | |
|---|---|---|---|
| 2,673,618 | 3/1954 | Batchelder | 137/202 |
| 2,853,092 | 9/1958 | Klikunas | 137/202 |
| 3,557,837 | 1/1971 | Giwosky | 137/630.14 |
| 4,982,757 | 1/1991 | Ohashi et al. | 137/202 |
| 5,044,389 | 9/1991 | Gimby | 137/630.14 X |
| 5,172,714 | 12/1992 | Kobayashi | 137/43 X |
| 5,439,023 | 8/1995 | Horikawa | 137/202 |

FOREIGN PATENT DOCUMENTS 1082992  3/1984  U.S.S.R. ..................... 137/202

*Primary Examiner*—Stephen M. Hepperle
*Attorney, Agent, or Firm*—Cushman Darby & Cushman IP Group of Pillsbury Madison & Sutro LLP

[57] ABSTRACT

A fuel cutoff valve capable of preventing a sudden rise in the internal pressure of the fuel tank during charging of fuel into the fuel tank and capable of controlling the rise in the internal pressure in stages, thereby making it possible to smoothly charge the fuel to a full tank. The fuel cutoff valve includes of a float accommodated in a case having air holes, a valve element disposed on top of the float so as to close an air efflux channel, and a spring for assisting a valve-closing movement of the float. The valve element is formed of rubber, and includes a base portion attached to an upper portion of the float and a disk-shaped seal portion capable of being brought into pressure contact with an entire peripheral edge of the air efflux channel, air holes being formed in the seal portion. The float includes in its upper portion a plate-like valve seat disposed below the seal portion and capable of closing the air holes in the seal portion when the valve seat is brought into pressure contact with the outer peripheral edge of the seal portion, and a base-portion attaching portion disposed in a center of the valve seat.

1 Claim, 8 Drawing Sheets

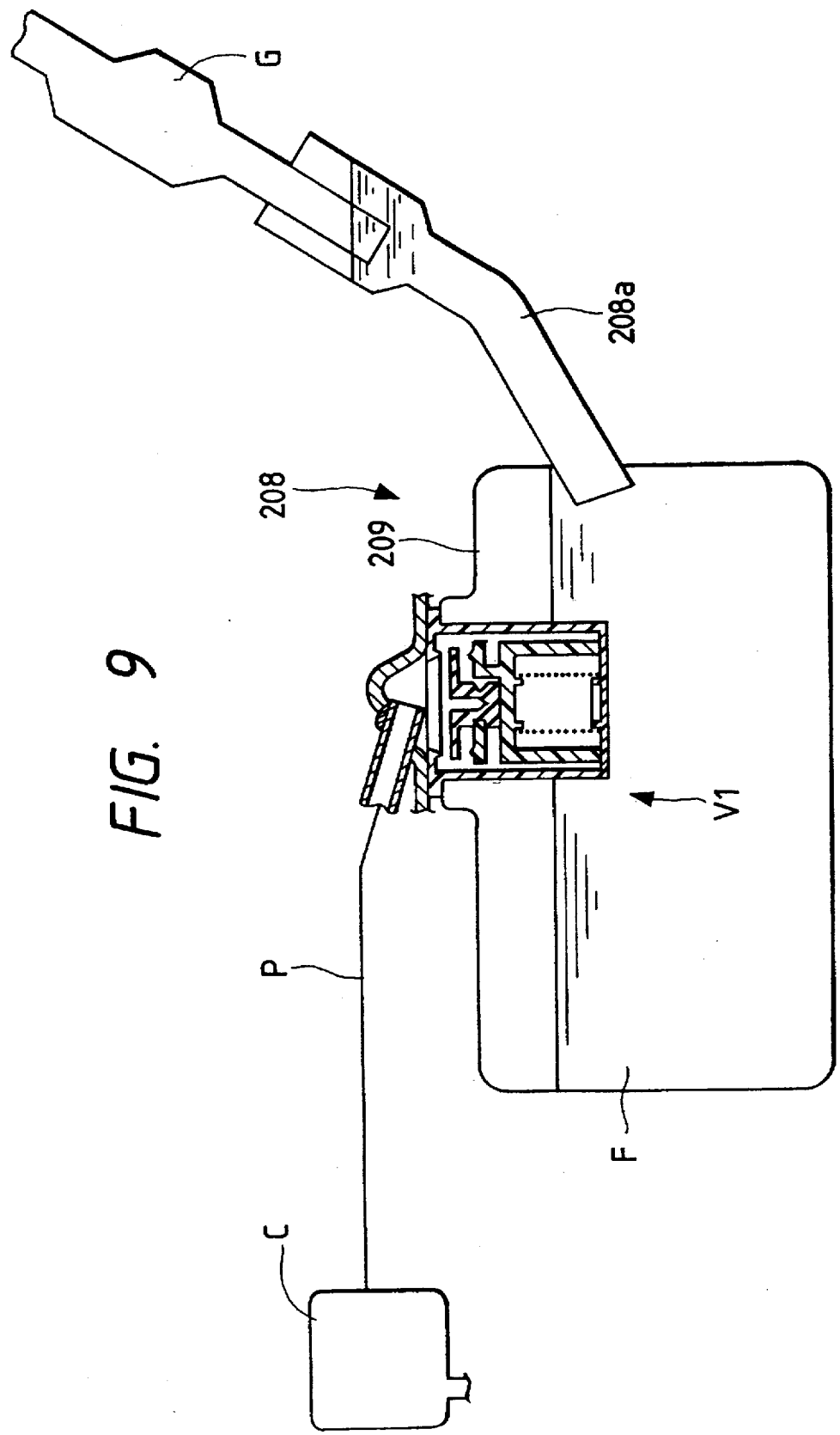

FUEL CUTOFF VALVE

This is a division of application Ser. No. 08/320,652, filed Oct. 11, 1994, now abandoned.

The priority applications, Japanese Patent application Hei-5-301241, filed in Japan on Nov. 5, 1993 and Japanese Patent Application No. Hei-6-67417, filed in Japan on Apr. 5, 1994 are hereby incorporated into the present specification by reference.

BACKGROUND OF THE INVENTION

1. Field of Invention

The present invention relates to a fuel cutoff valve for allowing air in the fuel tank to flow out therethrough during refueling, and for preventing fuel from flowing to the outside of a fuel tank when a liquid level in the fuel tank has risen.

2. Description of Related Art

A conventional fuel cutoff valve of this type is shown in FIG. 1 and has been disclosed in Unexamined Japanese Utility Model Publication (Kokai) Hei-2-34762/(1990). As shown, a fuel cutoff valve 100 is provided in a case 110 which is disposed in an upper portion of a fuel tank T. The case 110 includes a top plate 114 having a communicating hole 112 communicating with a canister-side efflux channel 102 connected to a canister (not shown), a cylindrical side wall 116 formed in such a manner as to project downwardly from the top plate 114, and a bottom wall plate 118 formed at a lower portion of the side wall 116. A valve chamber 120 is defined so as to be surrounded by the top plate 114, the side wall, and the bottom wall plate 118.

A communicating hole 130 communicating with the fuel tank T is provided in a lower portion of the valve chamber 120. A float valve 140 having a closing projection 142 on its upper surface is disposed in the valve chamber 120. The float valve 140 is urged by a coil spring 144.

Due to such an arrangement of the fuel cutoff valve 100, when a liquid fuel does not enter the valve chamber 120, the float valve 140 is positioned at the upper surface of the bottom wall plate 118 within the valve chamber 120, and the fuel tank T is communicated with the communicating hole 130, the valve chamber 120, the communicating hole 112, and the canister-side efflux channel 102.

When the liquid fuel has entered the valve chamber 120, the float valve 140 rises due to its buoyancy resulting from a rise in the level of the liquid fuel. Then, the closing projection 142 at the top of the float valve 140 plunges into the communicating hole 112 to close the communicating hole 112, thereby preventing the liquid fuel from flowing into the canister-side efflux channel 102.

However, with the above-described conventional fuel cutoff valve 100, since the closing projection 142 is formed of a resin integrally with the float valve 140, if an attempt is made to enhance the sealing characteristic of the closing projection 142 with respect to a seat portion 114a of the communicating hole 112, high accuracy is required. To fabricate the fuel cutoff valve with such high accuracy, post-machining is required, or it is necessary to conduct production control strictly, which results in a higher cost. In addition, there has been a problem in that when the closing projection 142 is frequently brought into contact with the seat portion 114a, an impression of the seal is formed at the portion of the closing projection 142 which comes into contact with the seat portion 114a, thereby causing a decline in the sealing characteristic.

Furthermore, other fuel cutoff valves of this type, those shown in Unexamined Japanese Patent Publication (Kokai) Hei-5-185850/(1993) and Post-examined Japanese Utility Model Publication (Kokoku) Hei-4-39061/(1992) are known, and they have a structure shown in FIG. 2.

Namely, a float valve 200 is comprised of a cylindrical case 201 with a bottom, a float 204 accommodated in the case 201, a valve portion disposed on top of the float 204 and capable of closing an air efflux channel 207, and a compression coil spring 206 disposed between the float 204 and a bottom wall 202 of the case 201. The case 201 is fixed to an upper wall 209 of a fuel tank 208.

In the case 201, a through hole 202a and an air hole 203a are formed in the bottom wall 202 and a side wall 203, respectively, so as to permit the influx of fuel F and air A into the case 201.

In addition, the coil spring 206 is an auxiliary member for assisting the float 204 in closing the air efflux channel 207 in the event that a vehicle is inclined or overturned. Namely, in the event that the vehicle is overturned, for instance, the air efflux channel 207 is located below the float 204, and the load on the spring 206 is set such that the sum of the mass of the float 204 and the urging force of the spring 206 at that time becomes greater than the buoyancy of the float 204. It goes without saying that the spring load on the spring 206 does not raise the float 204 in such a manner as to close the air efflux channel 207 before the level of fuel F rises when the vehicle is in a proper posture, and the spring load on the spring 206 is set in a range in which the sum of the buoyancy of the float 204 and the urging force of the spring 206 becomes greater than the mass of the float 204.

For this reason, with the float valve 200 of this type, if the level of fuel F in the fuel tank 208 rises at normal times, the fuel F flows into the case 201 through the through hole 202a and the air hole 203a, and the float 204 rises as a result. Consequently, the valve portion 205 closes the air efflux channel 207, thereby making it possible to prevent the fuel F from flowing outside the tank 208. It should be noted that the air which has passed through the air efflux channel 207 is sent to a canister (not shown).

However, with the float valve 200, since a large quantity of fuel F is charged in a short time during the charging of the fuel F into the fuel tank 208, the following problems are encountered.

Namely, during refueling, air A suddenly flows into the case 201 through, the air hole 203a in the case 201, so that the rate of the air A flowing out through the air efflux channel 207 becomes high. As a result, the flow of the air A produces lift and acts to cause the float 204 to float upwards. In that state, the fuel F flows into the case 201 through the through hole 202a in the bottom wall 202 of the case 201, and when the float 204 rises due to its buoyancy caused by the fuel F, there have been cases where the valve portion 205 closes the air efflux channel 207 due to the flow of the air A before the level of fuel F rises to a position LF of the fuel level for disposing the float 204 to a proper valve-closing position when the tank is full. The valve-closing operation is liable to occur since the downwardly-oriented force of the float 204 (a value obtained by subtracting buoyancy and the urging force from the mass) is small when the float 204 produces buoyancy due to the fuel F.

In addition, such a valve-closing operation suddenly stops the flow of air to be discharged outside the fuel tank 208 during refueling, the valve-closing operation suddenly increases the internal pressure of the fuel tank 208. Hence, the following problems occur on the fuel-charging side of the fuel tank 208.

That is, although no problem occurs if the internal pressure of the fuel tank is increased in a stepwise manner, the above-described sudden rise in the internal pressure of the fuel tank 208 produces a reverse flow of the fuel to the fuel-charging side. Hence, a fuel injection gun (fueling nozzle) suddenly actuates an automatic stop mechanism, which is actuated upon detecting the internal pressure not less than a fixed value, so that the charging of fuel is stopped, and a predetermined amount of fuel cannot be charged, which is undesirable.

As a measure against this problem, it is conceivable to provide a check valve or the like, as described in Unexamined Japanese Utility Model Publication (Kokai) Sho-63-137033/(1991), but the number of component parts of the fuel tank becomes large, so that it is not preferable.

SUMMARY OF THE INVENTION

The present invention is aimed at overcoming the above-described problems of the conventional art, and its object is to provide a fuel cutoff valve capable of demonstrating an excellent sealing characteristic without requiring the post-processing of a sealing surface.

Another object of the invention is to provide a fuel cutoff valve capable of preventing a sudden rise in the internal pressure of the fuel tank during the charging of fuel into the fuel tank and of controlling the rise in the internal pressure in a stepwise manner, thereby making it possible to smoothly charge the fuel to a full tank.

To attain the above-described object, in accordance with the first aspect of the present invention, there is provided a fuel cutoff valve constructed and arranged to be disposed in an upper portion of a fuel tank so as to open and close a communicating opening provided in an efflux channel communicating from the fuel tank to a canister. The fuel cutoff valve includes a float chamber disposed in an upper portion of the fuel tank and communicating with the efflux channel; a float valve body which rises upward together with a fuel level when a liquid fuel enters the float chamber; a flexible valve element fitted to the float valve body and adapted to be seated on a seat portion provided around a periphery of the communicating opening as the float valve body rises upwardly. The valve element has a valve supporting portion supported by the float valve body and a seating portion extending on an outer peripheral side of the valve supporting portion. The seating portion is formed in such a manner as to be deflected in a direction opposite to a rising direction when the float valve body rises further upwardly from an initial closed state of the valve in which the seating portion abuts against the seat portion.

In the fuel cutoff valve of the first aspect of the present invention, when a fuel in the fuel tank enters the float chamber and the fuel level rises, the float valve body disposed in the float chamber moves toward the seat portion. A flexible valve element is fitted on the float valve body. The valve element is fitted to the float valve body at the valve supporting portion, and the seating portion extends on the outer peripheral side of the valve supporting portion. The seating portion is deflected in a direction opposite to a rising direction when the float valve body rises further upward from an initial closed state of the valve in which the seating portion abuts against the seat portion provided around the periphery of the communicating opening. Accordingly, since the seating portion is seated on the seat portion in a deflected state, the sealing characteristic is high.

In accordance with a second aspect of the present invention, there is provided a fuel cutoff valve for allowing air in the fuel tank to flow out during refueling, the fuel cutoff valve includes a case disposed in an upper portion of a fuel tank and having at least a bottom wall and a side wall extending upwardly from a peripheral edge of the bottom wall, an air hole being formed in the side wall; a float accommodated in the case; a valve element disposed in an upper portion of the float and capable of closing an air efflux channel; and an auxiliary member disposed between the bottom wall of the case and the float so-as to assist a valve-closing movement of the float. The valve element is formed of rubber and includes a base portion attached to the upper portion of the float and a disk-shaped seal portion projecting radially outwardly from an upper end of the base portion and capable of being brought into pressure contact with an entire peripheral edge of the air efflux channel. A vertically penetrating air hole is formed in the seal portion at a position located inwardly of a pressure-contacting portion of the seal portion with respect to the peripheral edge of the air efflux channel. The float includes in its upper portion a plate-like valve seat disposed below the seal portion and capable of closing the air hole in the seal portion when the valve seat is brought into pressure contact with the outer peripheral edge of the seal portion, and a base-portion attaching portion disposed in a center of the valve seat.

With the fuel cutoff valve in accordance with the second aspect of the present invention, even if the float rises due to its buoyancy caused by fuel or lift caused by air during the charging of fuel into the fuel tank, the seal portion of the valve element is first brought into pressure contact with the entire peripheral edge of the air efflux channel.

At that time, since the air hole is provided in the seal portion of the valve element in such a manner as to penetrate the same, the air efflux channel is not fully closed, and air, which flows into the case through the air hole in the side wall of the case, flows out through the gap between the seal portion of the valve element and the valve seat of the float and through the air hole in the seal portion of the valve element. Since the air flows through the air hole 16 formed in the seal portion of the valve element, the flowing-out route of the air is throttled as compared to the state before the seal portion of the valve element is brought into pressure contact with the peripheral edge of the air efflux channel. Hence, the internal pressure of the fuel tank is slightly raised.

Subsequently, when more fuel flows into the case, the float rises further due to its buoyancy to deflect the seal portion of the valve element. When the fuel level rises to the height of the fuel level at the time of a full tank, the outer peripheral edge on the lower surface side of the seal portion of the valve element abuts against the valve seat of the float. As a result, the air hole in the seal portion of the valve element is closed, thereby fully closing the air efflux channel. Then, the internal pressure of the fuel tank rises to a fixed value, and an automatic stop mechanism of a fuel injection gun (fueling nozzle) on a fuel filler port side is actuated, thereby stopping the charging of fuel.

Namely, with the fuel cutoff valve in accordance with the second aspect of the present invention, the air efflux channel is fully closed in two stages by the closure of the air efflux channel by the outer peripheral edge of the seal portion of the valve element and by the closure of the air hole in the seal portion of the valve element by the valve seat of the float during the charging of fuel into the fuel tank. Hence, the rise in the internal pressure can be controlled in stages, and the reverse flow of the fuel to the fuel filler port side can be prevented, thereby making it possible to smoothly charge the fuel to a full tank.

In accordance with a third aspect of the present invention, there is provided a fuel cutoff valve for allowing air in the fuel tank to flow out during refueling. The fuel cutoff valve including a case disposed in an upper portion of a fuel tank and having at least a bottom wall and a side wall extending upwardly from a peripheral edge of the bottom wall, an air hole being formed in the side wall; and a float accommodated in the case. A valve element is disposed in an upper portion of the float and is capable of closing an air efflux channel.

An auxiliary member is disposed between the bottom wall of the case and the float so as to assist a valve-closing movement of the float. The valve element is formed of rubber and includes a tubular portion extending vertically and having an air hole, and an umbrella-shaped seal portion extending radially outwardly from an upper end of the tubular portion and capable of closing the air efflux channel. The float includes in its upper portion a holding portion for holding the tubular portion in such a manner as to be capable of moving the tubular portion in a downward direction, a valve seat capable of closing the air hole in the tubular portion below the tubular portion, and an air hole capable of communicating with the air hole in the tubular portion when a lower end face of the tubular portion is spaced apart from the valve seat.

A spring for urging the valve element in an upward direction is disposed between the valve element and the float.

With the fuel cutoff valve in accordance with the third aspect of the present invention, even if the float rises due to its buoyancy caused by fuel or lift caused by air during the charging of fuel into the fuel tank, the seal portion of the valve element is first brought into pressure contact with the entire peripheral edge of the air efflux channel.

At that time, since the air hole is provided in tubular portion-of the valve element in such a manner as to penetrate the same, and a lower end of the tubular portion of the valve element is spaced apart from the valve seat of the float by means of the spring, the air efflux channel is not fully closed. Air, which flows into the case through the air hole in the side wall of the case, flows out through the air hole in the float and the air hole in the tubular portion of the valve element. Since the air flows through the air hole formed in the tubular portion of the valve element, the flowing-out route of the air is throttled as compared to the state before the seal portion of the valve element is brought into pressure contact with the peripheral edge of the air efflux channel. Hence, the internal pressure of the fuel tank is slightly raised.

Subsequently, when more fuel flows into the case, the float rises further due to its buoyancy, and downwardly moves the valve element relative to the float in opposition to the urging force of the spring. When the fuel level rises to the height of the fuel level at the time of a full tank, the lower end face of the tubular portion of the valve element abuts against the valve seat of the float. As a result, the air hole in the tubular portion of the valve element is closed, thereby fully closing the air efflux channel. Then, the internal pressure of the fuel tank rises to a fixed value, and an automatic stop mechanism of a fuel injection gun (fueling nozzle) on a fuel filler port side is actuated, thereby stopping the charging of fuel.

Namely, with the fuel cutoff valve in accordance with the third aspect of the present invention, the air efflux channel is fully closed in two stages by the closure of the air efflux channel by the outer peripheral edge of the seal portion of the valve element and by the closure of the air hole in the tubular portion of the valve element by the valve seat of the float during the charging of fuel into the fuel tank. Hence, the rise in the internal pressure can be controlled in stages, and the reverse flow of the fuel toward the fuel filler port having a liquid seal can be prevented, thereby making it possible to smoothly charge the fuel to a full tank.

Furthermore, with the fuel cutoff valve in accordance with the third aspect of the present invention, the spring disposed between the valve element and the float is used as a means for opposing the buoyancy of the float at the time of closing the air hole in the tubular portion of the valve element. Therefore, even if the buoyancy of the float is changed due to a design change in the weight and configuration of the float, adjustment can be simply made correspondingly by changing the spring to one having a different spring load.

BRIEF DESCRIPTION OF THE DRAWINGS

FIG. 9 is a cross-sectional view of a second embodiment of the invention, illustrating a state in which a float valve for a fuel tank is disposed in a fuel tank;

DETAILED DESCRIPTION OF THE PREFERRED EXEMPLARY EMBODIMENTS

To further clarify the above-described arrangement and operation of the present invention, a description will be given hereafter of preferred embodiments of the present invention.

Figure 1:
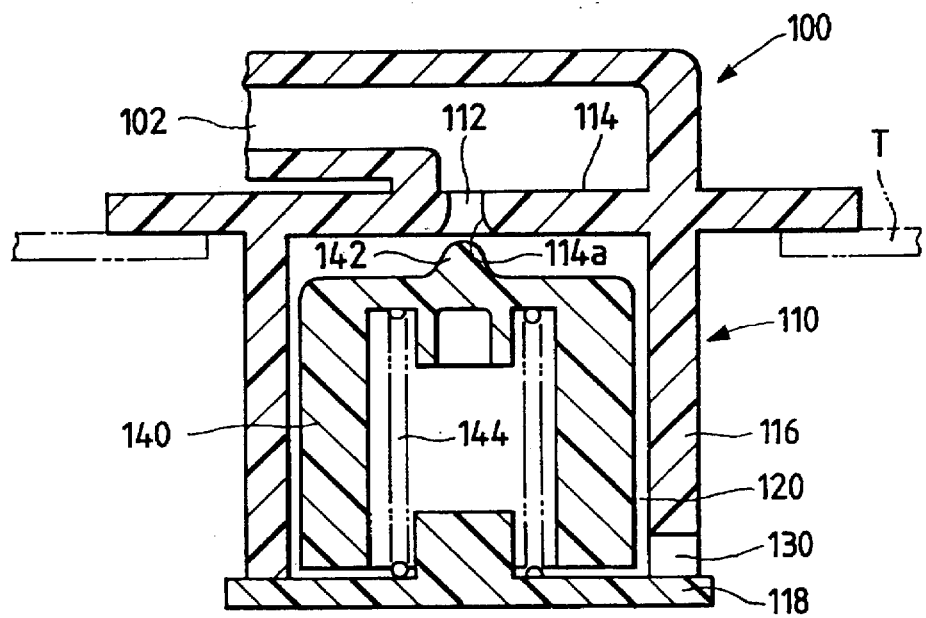
FIG. 1 is a cross-sectional view illustrating a conventional fuel cutoff valve.
Figure 2:
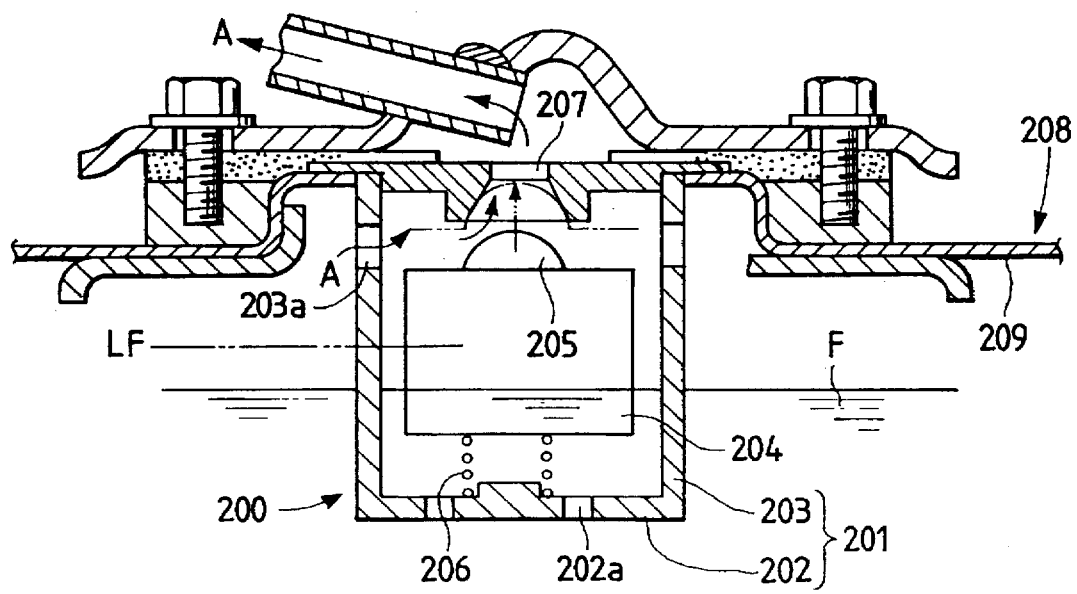
FIG. 2 is a cross-sectional view illustrating another conventional fuel cutoff valve.
Figure 3:
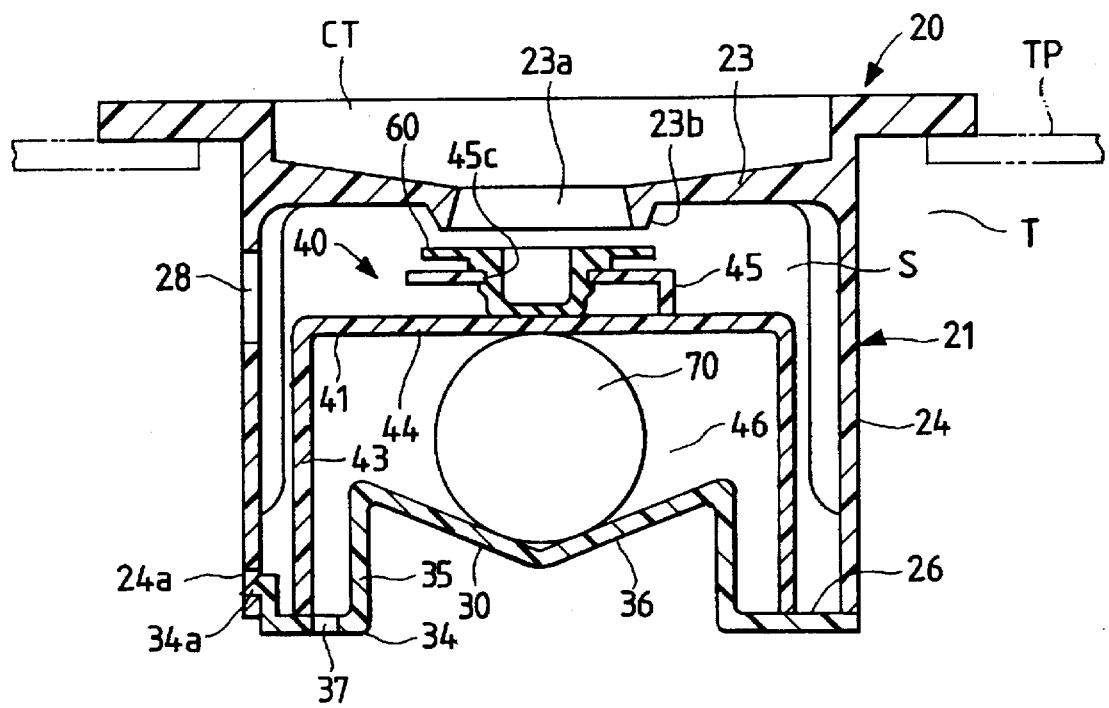
FIG. 3 is a cross-sectional view illustrating an open state of a fuel cutoff valve in accordance with a first embodiment of the present invention.

FIG. 3 is a cross-sectional view illustrating an open state of a fuel cutoff valve 20 attached to an upper portion of a fuel tank T. The fuel cutoff valve 20 is attached to a tank upper wall TP of the fuel tank T, and is disposed in a case body 21. The case body 21 includes an upper wall 23 having a communicating hole 23a communicating with a canister-side efflux channel CT, and a side wall 24 formed integrally with the upper wall 23. A case lower opening 26 is formed in a lower portion of the side wall 24. The case lower opening 26 is closed by a support member 30.

A plurality of pawls 34a are formed around an outer periphery of the support member 30, and as the pawls 34a are engaged with case lower notches 24a in the side wall 24, the support member 30 is supported by the side wall 24. A space surrounded by the case body 21 and the support member 30 is formed as a float chamber S.

A seat portion 23b is formed in a periphery of a lower surface of the communicating hole 23a in the upper wall 23 in such a manner as to project toward the float chamber S. An air hole 28 is formed in an upper portion of the side wall 24. This air hole 28 serves to introduce fuel vapor from the fuel tank T into the float chamber S.

The support member 30 has a bottom plate 34, a cylindrical upright wall 35, and a conical inclined recessed portion 36 which are formed of a resin as a unit. A fuel communicating hole 37 is formed in the bottom plate 34, and a liquid fuel in the fuel tank T is introduced into the float chamber S through the fuel communicating hole 37.

A float valve element 40 is accommodated in the float chamber S. The float valve element 40 is comprised of a float valve body 41 and a valve element 60 made of rubber. The float valve body 41 is integrally formed of a resin by being surrounded by a cylindrical wall 43 and an upper surface portion 44, and an interior space thereof is formed as a buoyancy chamber 46. In addition, a valve supporting portion 45 is formed in the upper surface portion 44. The valve supporting portion 45 is formed by a leg 45a and a horizontal supporting portion 45b, and a valve element-supporting opening 45c for supporting the valve element 60 is formed in the horizontal supporting portion 45b.

Figure 5:
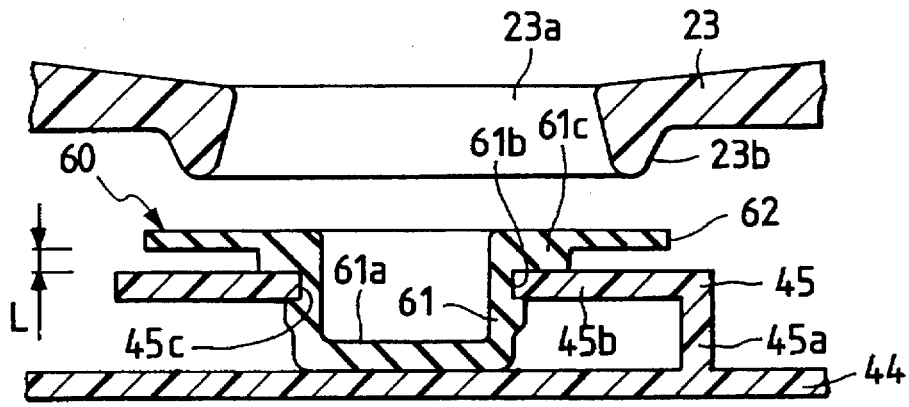
FIG. 5 is an enlarged cross-sectional view illustrating the open state of the fuel cutoff valve of the invention.

As shown in FIG. 5, the valve element 60 includes a dish-shaped portion 61 having a bottomed hole 61a, a supporting stepped portion 61c provided with the valve element-supporting opening 45c, and a seating portion 62. These portions are integrally formed of rubber. The seating portion 62 has a plate-shaped configuration, and a gap L is formed between the same and the horizontal supporting portion 45b of the float valve element 40. As a result, the seating portion 62 is formed such that when the seating portion 62 is seated on the seat portion 23b, the seating portion 62 is deflected in a direction in which it abuts against the horizontal supporting portion 45b.

Figure 8:
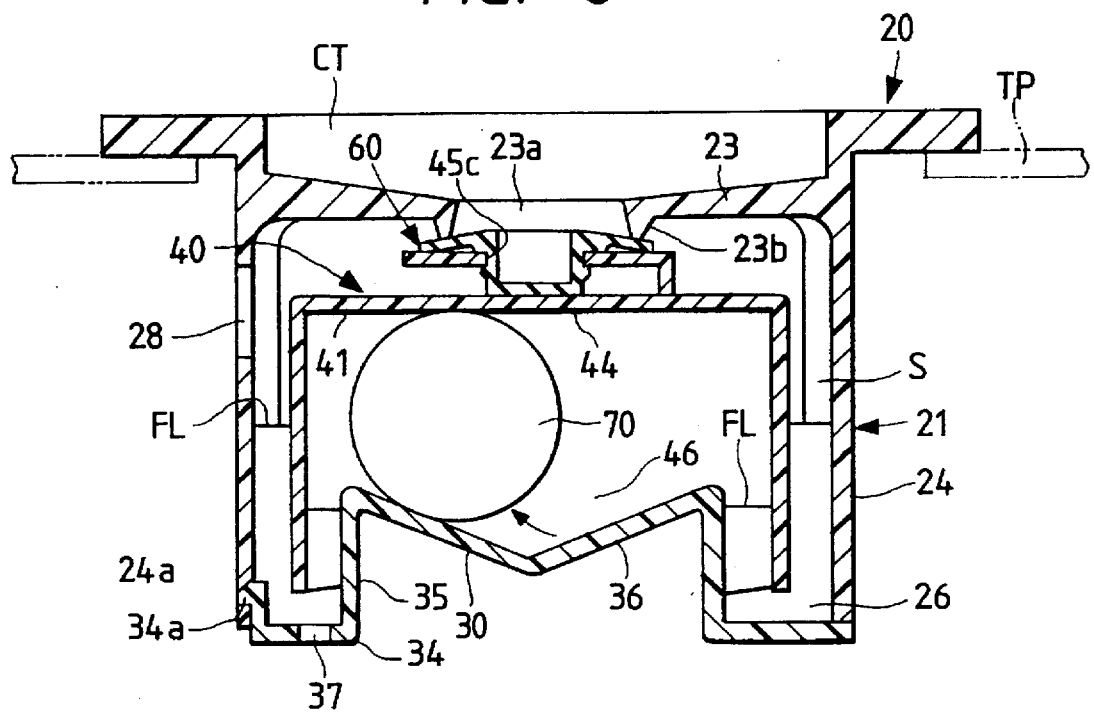
FIG. 8 is a cross-sectional view illustrating a closed state of the fuel cutoff valve of the invention accompanying the lateral rolling of a vehicle.

In addition, a ball 70, preferably made of stainless steel is placed in the conical inclined recessed portion 36 of the support member 30, and the ball 70 abuts against the upper surface portion 44 of the float valve body 41. As shown in FIG. 8, when the fuel tank T has been inclined and the ball 70 has risen on the conical inclined recessed portion 36, the ball 70 moves the float valve element 40 contacting the ball 70 in a valve-closing direction.

With the fuel cutoff valve 20 in the above-described embodiment, when the fuel level in the fuel tank T has not reached the float chamber S, as shown in FIG. 3, the fuel tank T is made to communicate with the canister-side efflux channel CT via the air hole 28, the float chamber S, and the communicating hole 23a.

Figure 4:
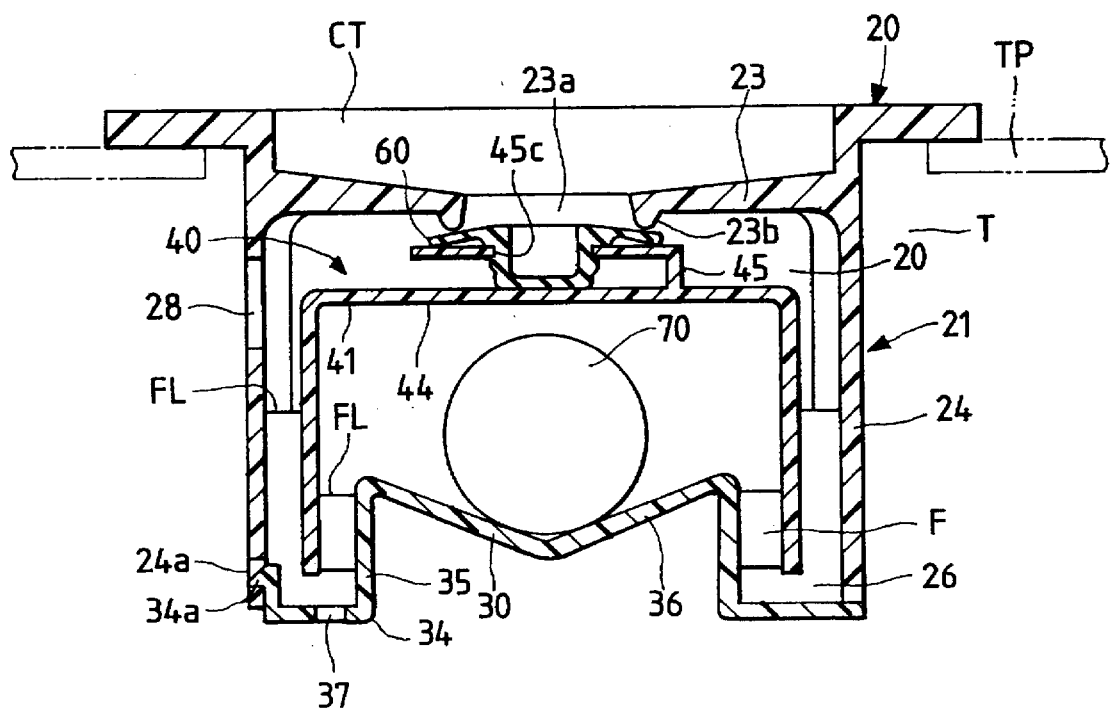
FIG. 4 is a cross-sectional view illustrating a closed state of the fuel cutoff valve in accordance with the first embodiment of the invention.
Figure 6:
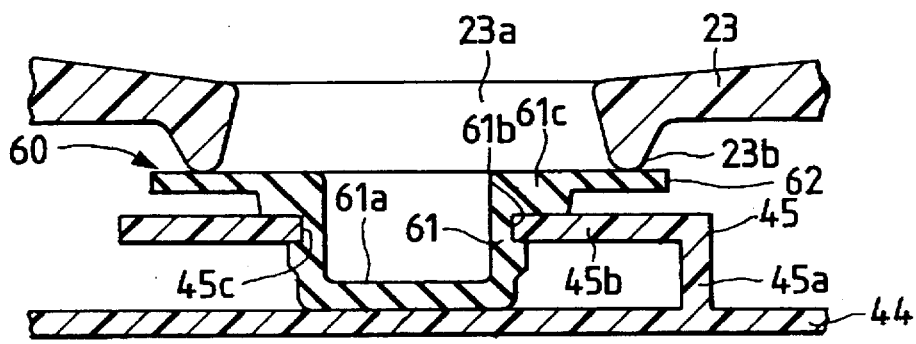
FIG. 6 is an enlarged cross-sectional view illustrating an initial closed state of the fuel cutoff valve of the invention.
Figure 7:
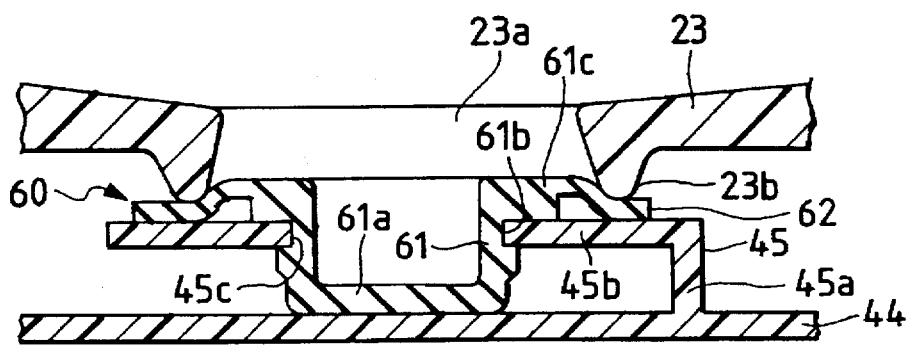
FIG. 7 is an enlarged cross-sectional view illustrating a closed state of the fuel cutoff valve of the invention.

Meanwhile, when a fuel level FL has risen due to the charging of fuel into the fuel tank T, and the liquid fuel F enters the buoyancy chamber 46 through the fuel communicating hole 37, as shown in FIG. 4, buoyancy is produced in the float valve element 40, so that the float valve element 40 rises upwardly. Then, the seating portion 62 of the valve element 60 fitted to the float valve element 40 rises in the state shown in FIG. 5, and comes into contact with the seat portion 23b, as shown in FIG. 6. Further, when the fuel level FL rises, the rubber-made seating portion 62 is deflected in such a manner as to narrow the gap L between the same and the horizontal supporting portion 45b, and closes the communicating hole 23a, as shown in FIG. 7. As a result, the fuel cutoff valve 20 shuts off the fuel tank T from the canister-side efflux channel CT.

In the above-described embodiment, the seating portion 62 of the valve element 60 is seated on the seat portion 23b in a state in which it is deflected in a direction opposite to the valve-opening direction, and since its contact area is large, the seating portion 62 of the valve element 60 is capable of closing the communicating hole 23a with a high sealing characteristic. Accordingly, since the liquid fuel does not leak to the canister when the valve is closed, the adsorption characteristic of the canister does not deteriorate. Moreover, since the seating portion 62 of the valve element 60 is flat, and the seat portion 23b is formed as an angular projection, the sealing characteristic is further improved.

In addition, since the seating portion 62 of the valve element 60 is formed of rubber and is seated by being deflected, high dimensional accuracy is not required for obtaining a high sealing characteristic. Accordingly, high accuracy during molding and post-machining, although conventionally required, are not required, and the production process is simplified.

Further, since the valve element 60 is not formed of a resin as in the case of the conventional art, an impression of the seal is not formed on the surface of the valve element 60, with the result that the sealing characteristic is less likely to deteriorate.

In addition, in the above-described embodiment, when the fuel tank T is inclined due to such as the lateral rocking of the vehicle, the ball 70 moves upward along a supporting recessed portion 61b, and pushes the float valve element 40 upwardly, thereby closing the communicating hole 23a by means of the valve element 60, as shown in FIG. 6. Hence, the liquid fuel F in the fuel tank T can be prevented from flowing out to the canister-side efflux channel CT.

Next, a second embodiment of the invention will be described.

Figure 10:
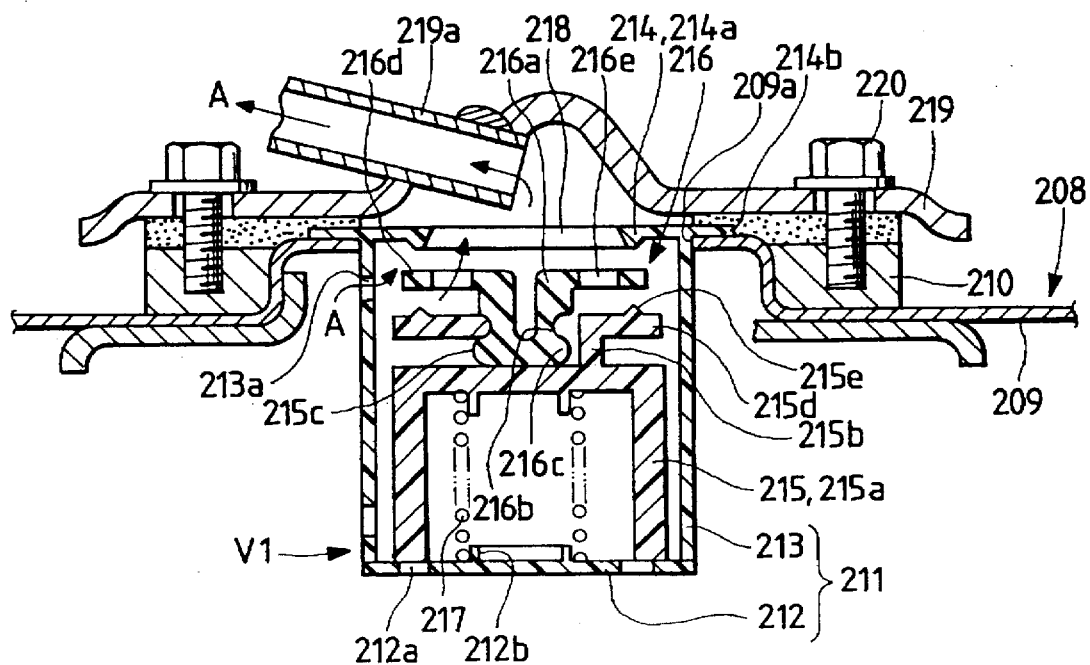
FIG. 10 is a cross-sectional view of the second embodiment of the invention.

As shown in FIGS. 9 and 10, a float valve V1 for a fuel tank in accordance with a second embodiment is comprised of a case 211, a float 215 disposed within the case 211, a valve element 216 attached to the float 215, and a compression coil spring 217 serving as an auxiliary member for assisting the valve-closing movement of the float 215, and the fuel valve V1 for a fuel tank is disposed in an upper wall 209 of a fuel tank 208.

Incidentally, in addition to a pipe P to a canister C, a pipe for supplying fuel to an engine (not shown) side and a return pipe for fuel F are connected to the fuel tank 208. In addition, a filler pipe 208a for inserting a fuel injection gun G is disposed on a fuel filler port side.

The case 211 is formed of a synthetic resin such as polyacetal or polyamide which is resistant to fuel oil. The case 211 is comprised of a substantially disk-shaped bottom wall 212, a cylindrical side wall 213, and an annular top wall 214 which extends to an inner peripheral side and an outer peripheral side at an upper end of the side wall 213.

The bottom wall 212 has a plurality of through holes 212a through which the fuel F flows into the case 211, and a hollow cylindrical rib 212b is formed on an upper surface thereof for restricting the position of the spring 217.

The side wall 213 is joined to the bottom wall 212 in such a manner as to extend upwardly from a peripheral edge of the bottom wall 212, and has a plurality of air holes 213a for allowing the inner peripheral side thereof to communicate with the outer peripheral side thereof.

The top wall 214 has a partition wall 214a extending to the inner peripheral side of the side wall 213, and a flange 214b extending to the outer peripheral side of the side wall 213. A central hole in the partition wall 214a is formed as an air efflux channel 218 for allowing air A to flow out to the canister C side. The flange 214b serves as a portion which is used when the float valve V1 is fixed to the upper wall 209 of the tank. The valve V1 is fixed to the upper wall 209 of the tank by being attached with bolts 220 to a base 210 welded to the periphery of an attaching hole 209a in the upper wall 209 of the tank. A nipple 219a for connecting the pipe P which is connected to the canister C is fixed to the upper cover 219.

The valve element 216 is formed of a rubber material such as a fluorocarbon rubber or a nitrile rubber, and is comprised of a base portion 16a attached to an upper portion of the float 215 and a disk-shaped seal portion 216d which projects radially outwardly from an upper end of the base portion 216a and is capable of being brought into pressure contact with an entire peripheral edge of the air efflux channel 218.

A U-groove 216b and a swollen portion 216c which are used to attach the valve element 216 to an attaching portion 215b of the float 215 are formed in a lower portion of the base portion 216a.

A plurality of vertically penetrating air holes 216e are formed in the seal portion 216d at positions located inwardly of a pressure-contacting portion thereof with respect to the peripheral edge of the air efflux channel 218.

The float 215 is formed of a synthetic resin such as polyacetal or polyamide which is resistant to fuel oil. The float 215 is comprised of a cylindrical body 215a for producing buoyancy due to the fuel F and the attaching portion 215b disposed on top of the body 215a.

The attaching portion 215b is formed in a substantially cylindrical shape projecting upwardly from the upper surface of the body 215a, and a through hole 215c penetrating the attaching portion 215b in a horizontal direction is formed in the attaching portion 215b. The attachment of the base portion 216a of the valve element 216 is effected by inserting the swollen portion 216c into the through hole 215c and retaining the same at the through hole 215c. Such a configuration of the attaching portion 215b is designed not to make the structure of a slide core complicated when the body 15a, the attaching portion 215b, and a valve seat 215d of the float 215, which will be described later, are injection molded integrally. In addition, the through hole 215c is closed if the swollen portion 216c is inserted and retained thereat.

The valve seat 215d, which extends radially outwardly in a disk shape, is formed at an upper end of the attaching portion 215b of the float 215 after the attachment of the base portion 216a of the valve element to the attaching portion 215b, such that the valve seat 215d is disposed by being spaced apart a predetermined distance from a lower surface of the seal portion 216d of the valve element. An annular projection 215e in the shape of a circular ring is formed at an outer peripheral edge on an upper surface of the valve seat 215d in such a manner as to oppose the lower surface of the entire outer peripheral edge of the seal portion 215 of the valve element.

The coil spring 217 is disposed between the lower surface of the float body 215a and the bottom wall 212 of the case.

Figure 11:
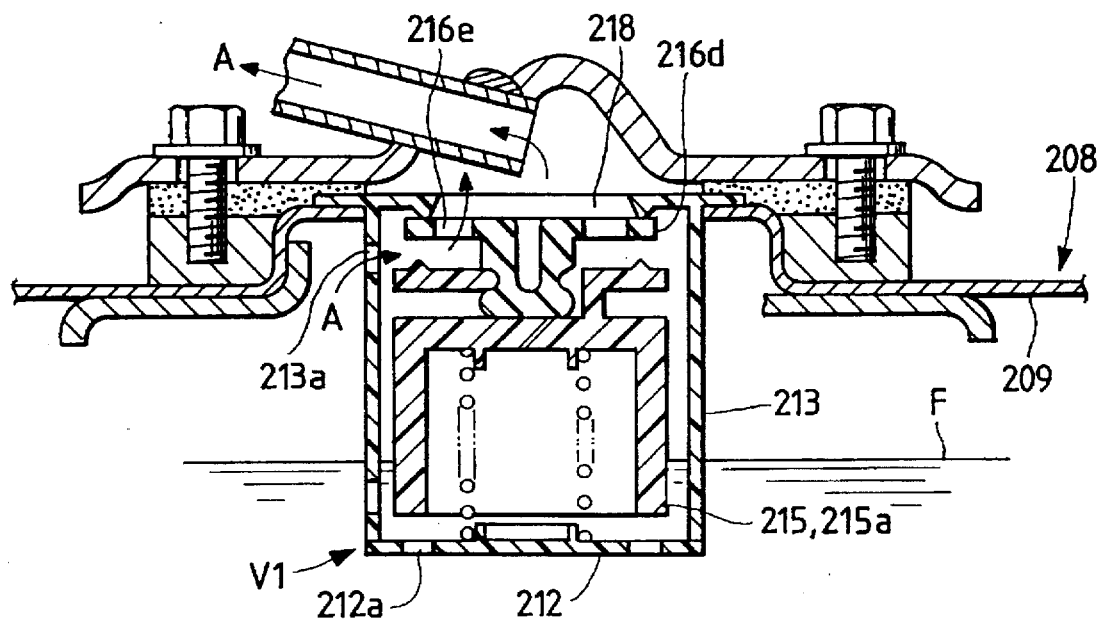
FIG. 11 is a cross-sectional view illustrating a state of use in accordance with the second embodiment of the invention.

In the float valve V1 of this second embodiment, even if the float 215 rises due to its buoyancy caused by the fuel F flowing into the case 211 or the lift caused by the air A flowing in during the charging of the fuel F into the fuel tank 208, the seal portion 16d of the valve element is first brought into pressure contact with the entire peripheral edge of the air efflux channel 18, as shown in FIG. 11.

At that time, since the air holes 216e are provided in the seal portion 216d of the valve element in such a manner as to penetrate the same, the air efflux channel 218 is not fully closed, and the air A, which flows into the case 211 through the air holes 213a in the side wall 213 of the case, flows out through the gap between the seal portion 216d of the valve element and the valve seat 215d of the float 215 and through the air holes 216e in the seal portion 216d of the valve element. Since the air A flows through the air holes 216e formed in the seal portion 16d of the valve element, the flowing-out route of the air A is throttled as compared to the state shown in FIG. 10 before the seal portion 216d of the valve element is brought into pressure contact with the peripheral edge of the air efflux channel 218. Hence, the internal pressure (liquid pressure) of the fuel tank 208 is slightly raised.

Figure 12:
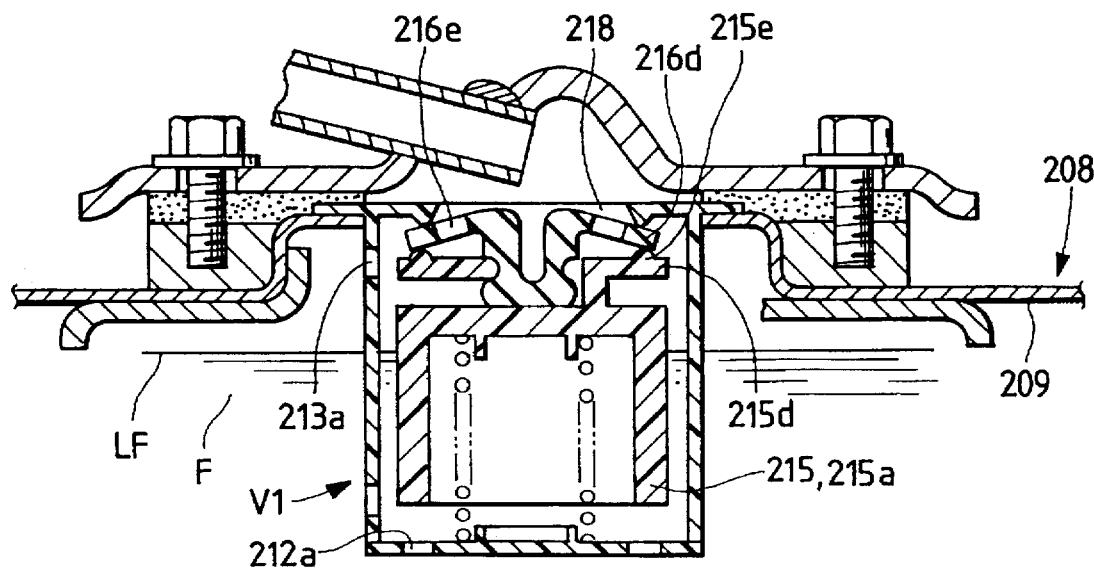
FIG. 12 is a cross-sectional view illustrating a state of use in accordance with the second embodiment of the invention, and illustrates a state subsequent to that of FIG. 11.

Subsequently, when more fuel F flows into the case 211, the float 215 rises further due to its buoyancy to deflect the seal portion 216d of the valve element. When the fuel level rises to the height LF of the fuel level at the time of a full tank, as shown in FIG. 12, the outer peripheral edge on the lower surface side of the seal portion 216d of the valve element abuts against the annular projection 215e of the valve seat 215d of the float 215. As a result, the air holes 216e in the seal portion 216d of the valve element are closed, thereby fully closing the air efflux channel 218. Then, the internal pressure of the fuel tank 208 rises to a fixed value, and the automatic stop mechanism of the fuel injection gun G inserted in the filler pipe 208a is actuated, thereby stopping the charging of fuel.

Namely, with this-float valve V1, the air efflux channel 218 is fully closed in two stages by the closure of the air efflux channel 218 by the outer peripheral edge of the seal portion 216d of the valve element and by the closure of the air holes 216e in the seal portion 216d of the valve element by the valve seat 215d of the float 215.

Figure 13:
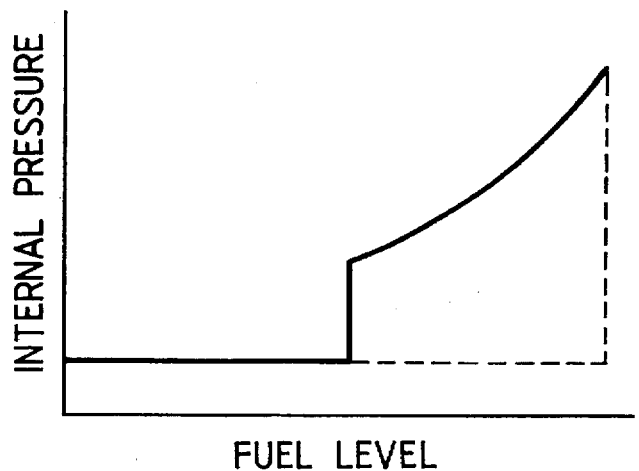
FIG. 13 is a graph illustrating the relationship between the internal pressure (liquid pressure) of the tank and the height of the liquid surface (liquid level) in the case of the embodiment of the invention and a conventional example.

For this reason, as shown in FIG. 13, the internal pressure (liquid pressure) does not rise sharply in the conventional manner as indicated by the broken line, and the rise in the internal pressure (liquid pressure) can be controlled in two stages. Consequently, the reverse flow of the fuel F to the filler pipe 208a side can be prevented, thereby making it possible to smoothly charge the fuel to a full tank.

In addition, with this float valve V1, since the valve element 216 attached to the float 215 is made of rubber, the sealing performance can be improved.

Figure 14:
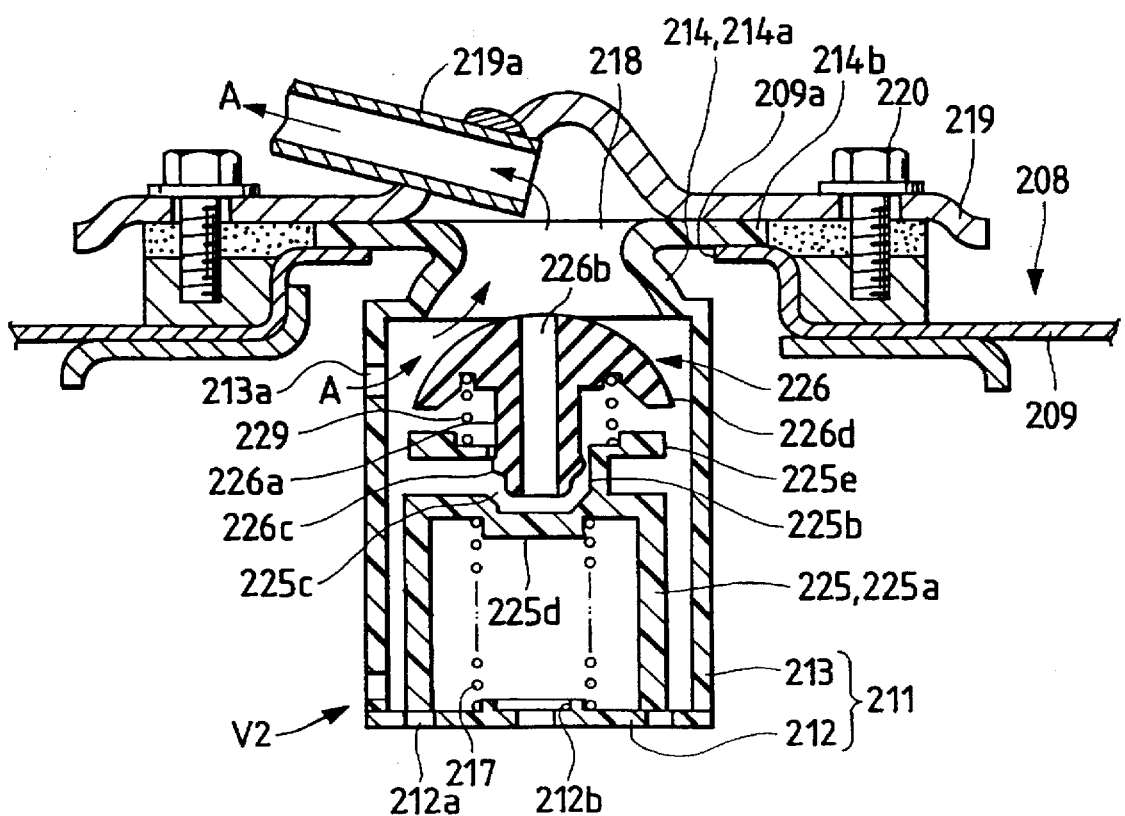
FIG. 14 is a cross-sectional view illustrating a third embodiment of the invention.

In the float valve V1 of this second embodiment, the arrangement provided is such that the closure of the air efflux channel 218 is controlled in two stages by making use of the deflection of the seal portion 216d of the valve element. However, an arrangement may be provided such that the air efflux channel 218 is closed in two stages by moving a valve element 226 itself as in the case of a float valve V2 in accordance with a third embodiment shown in FIGS. 14 to 16. It should be noted that those members which are substantially similar to those of the second embodiment will be denoted by the same reference numerals, and a description thereof will be omitted.

The valve element 226 of the third embodiment is formed of a rubber material similar to that of the valve element 216 of the second embodiment, and is comprised of a cylindrical tubular portion 226a extending vertically and having an air hole 226b, and an umbrella-shaped seal portion 226d extending radially outwardly at an upper end of the tubular portion 226a and capable of closing the air efflux channel 218. A retaining protrusion 226c is formed around an entire outer periphery of a lower portion of the tubular portion 226a.

A float 225 is formed of a synthetic resin similar to that of the float 215 of the first embodiment, and is comprised of a cylindrical body 225a for producing buoyancy due to the fuel F and a holding portion 225b disposed on top of the body 225a and holding the tubular portion 226a of the valve element in such a manner as to be capable of moving the tubular portion 226a of the valve element in a downward direction.

The holding portion 225b is arranged in such a manner as to project upwardly from an upper surface of the body 225a in a hollow cylindrical shape, and the holding portion 225b has an air hole 225c penetrating the same in a horizontal direction. This air hole 225c serves as a portion for retaining the retaining protrusion 226c of the tubular portion 226 of the valve element. In addition, the upper surface of the body 225a surrounded by the holding portion 225b serves as a valve seat 225d for closing the air hole 226b in the tubular portion 226a of the valve element.

A disk-shaped spring seat 225e extending radially outwardly is formed at an upper end of the float holding portion 225b, and the spring seat 225e supports a lower end of a compression coil spring 229 whose upper end abuts against a lower surface of the seal portion 226d of the valve element.

Figure 15:
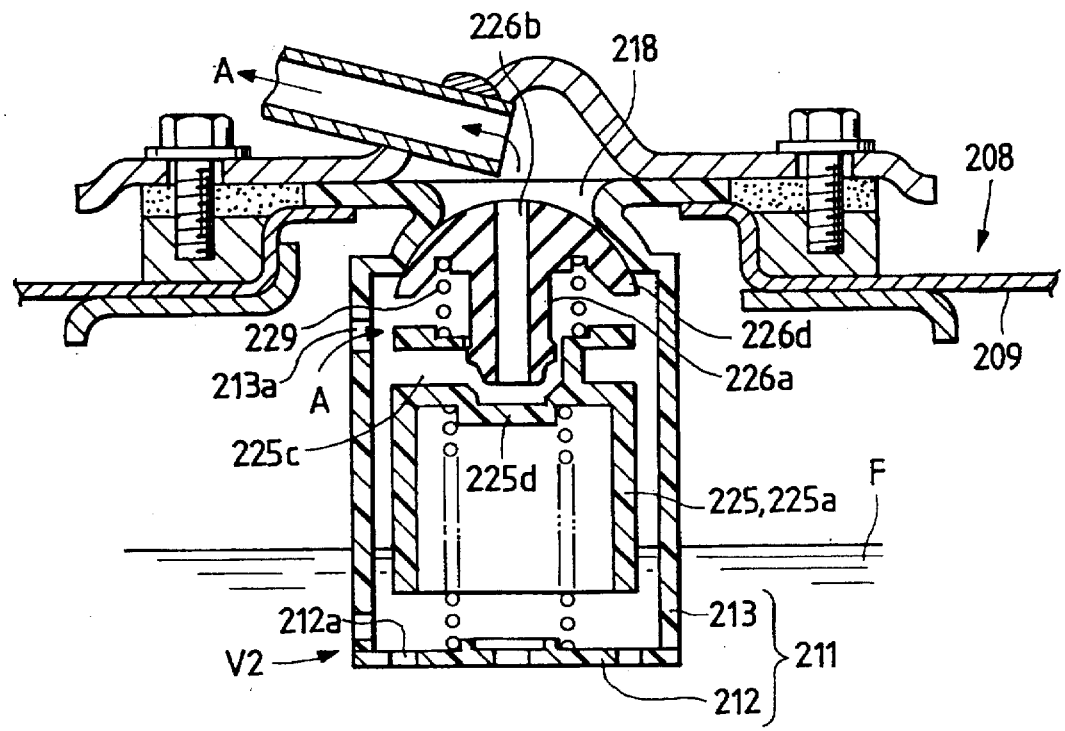
FIG. 15 is a cross-sectional view illustrating a state of use in accordance with the third embodiment of the invention.

In the float valve V2 of this third embodiment, even if the float 215 rises due to its buoyancy caused by the fuel F flowing into the case 211 or the lift caused by the air A flowing in during the charging of the fuel F into the fuel tank 208, the seal portion 226d of the valve element is first brought into pressure contact with the entire peripheral edge of the air efflux channel 218, as shown in FIG. 15.

At that time, since the air hole 226b is provided in the tubular portion 226a of the valve element in such a manner as to penetrate the same, and the lower end of the tubular portion 226a of the valve element is spaced apart from the valve seat 225d of the float 225 by means of the coil spring 229, the air efflux channel 218 is not fully closed. Hence, the air A, which flows into the case 211 through the air holes 213a in the side wall 213 of the case, flows out through the air hole 225c in the float 225 and the air hole 226b in the tubular portion 226a of the valve element. Since the air A flows through the air hole 226b formed in the tubular portion 226a of the valve element, the flowing-out route of the air A is throttled as compared to the state shown in FIG. 14 before the seal portion 226d of the valve element is brought into pressure contact with the peripheral edge of the air efflux channel 218. Hence, the internal pressure of the fuel tank 208 is slightly raised.

Figure 16:
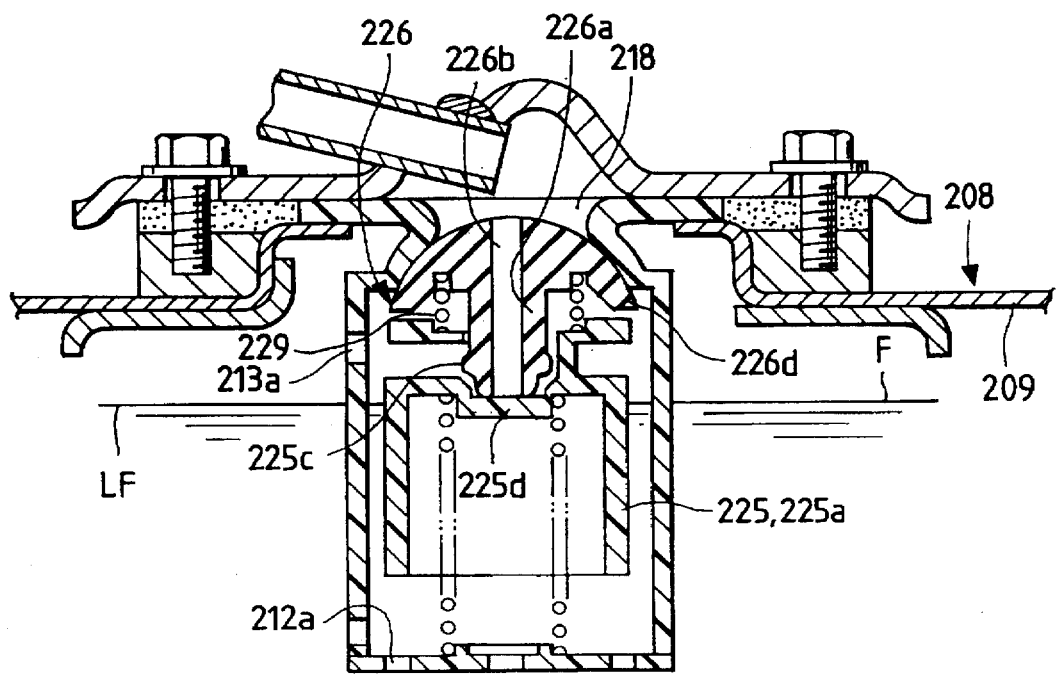
FIG. 16 is a cross-sectional view illustrating a state of use in accordance with the third embodiment of the invention, and illustrates a state subsequent to that of FIG. 15.

Subsequently, when more fuel F flows into the case 211, the float 225 rises further due to its buoyancy and downwardly moves the valve element 226 relative to the float 225 in opposition to the urging force of the spring 229. When the fuel level rises to the height LF of the fuel level at the time of a full tank, as shown in FIG. 16, the lower end face of the tubular portion 226a of the valve element abuts against the valve seat 225d of the float 225. As a result, the air hole 226b in the tubular portion 226a of the valve element is closed, thereby fully closing the air efflux channel 218. Then, it is possible to demonstrate operation and advantages similar to those of the second embodiment.

Furthermore, with this float valve V2, the coil spring 229 disposed between the valve element 226 and the float 225 is used as a means for opposing the buoyancy of the float 225 at the time of closing the air hole 226b in the tubular portion 226a of the valve element. Therefore, even if the buoyancy of the float 225 is changed due to a design change in the weight and configuration of the float 225, the closing load on the air hole 226b can be simply adjusted correspondingly by changing the spring 229 to one having a different spring load.

As described above, in accordance with the fuel cutoff valve of the present invention, since the valve element provided on the float valve body is formed in such a manner as to be deflected in a direction opposite to a rising direction when the float valve body rises further upward from an initial closed state of the valve in which the valve abuts against the seat portion, the sealing characteristic of the fuel tank is high, and post-processing and the like are not required for realizing a high sealing characteristic.

With the fuel cutoff valve for a fuel tank in accordance with the present invention, the air efflux channel is fully closed in two stages by the closure of the air efflux channel by the outer peripheral edge of the seal portion of the valve element and by the closure of the air hole in the seal portion of the valve element by the valve seat of the float during the charging of fuel into the fuel tank. Hence, the rise an the internal pressure can be controlled in stages, and the reverse flow of the fuel to the fuel filler port side can be prevented, thereby making it possible to smoothly charge the fuel to a full tank.

While the invention has been described in connection with what is presently considered to be the most practical and preferred embodiments, it is to be understood that the invention is not limited to the described embodiments but, on the contrary, is intended to cover various modifications and equivalent arrangements included within the spirit and scope of the appended claims.

What is claimed is:

1. A fuel cutoff valve constructed and arranged to permit air in a fuel tank to flow out of the tank during refueling, said a fuel cutoff valve comprising:

a case constructed and arranged to be disposed in an upper portion of a fuel tank and having at least a bottom wall, a side wall extending upwardly from a peripheral edge of said bottom wall and a top wall opposite said bottom wall, said top wall including an air efflux channel, an air hole being formed in said side wall;

a float accommodated in said case; and a valve element integrally formed with said float at an upper portion thereof and being movable by said float so as to close and open the air efflux channel, said valve element including:

a first seal surface constructed and arranged to contact a portion of the top wall defining said air efflux channel, an air passage for allowing air to pass from said air hole to said efflux channel even when the first seal surface is in contact with said top wall portion, and a second seal surface constructed and arranged to contact said float after the first seal surface is in contact with said top wall portion, thereby closing said air passage and preventing fuel from flowing through the efflux channel, said valve element being formed of rubber and comprising a base portion defining said air passage therethrough, and a generally umbrella-shaped seal portion extending radially outwardly from an upper end of said base portion, said umbrella-shaped portion defining said first and second seal surfaces, and wherein said float includes in its upper portion a holding portion for holding said tubular portion in such a manner as to be capable of moving said base portion, and a valve seat capable of closing said air passages, said value element being biased by a spring so that said base portion is biased away from said valve seat.

* * * * *